United States Patent
Fujimoto et al.

(10) Patent No.: US 10,053,107 B2
(45) Date of Patent: Aug. 21, 2018

(54) VEHICULAR AWAKENING DETECTION DEVICE

(71) Applicant: HONDA MOTOR CO., LTD., Tokyo (JP)

(72) Inventors: Naotoshi Fujimoto, Wako (JP); Wataru Kimatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/472,477

(22) Filed: Mar. 29, 2017

(65) Prior Publication Data

US 2017/0282935 A1    Oct. 5, 2017

(30) Foreign Application Priority Data

Mar. 30, 2016 (JP) .................. 2016-067096

(51) Int. Cl.
| | |
|---|---|
| *G08B 23/00* | (2006.01) |
| *B60W 40/08* | (2012.01) |
| *B60W 50/08* | (2012.01) |
| *G08B 21/06* | (2006.01) |
| *B60K 28/06* | (2006.01) |

(Continued)

(52) U.S. Cl.
CPC ............ *B60W 40/08* (2013.01); *B60K 28/06* (2013.01); *B60K 28/066* (2013.01); *B60W 50/08* (2013.01); *B60W 50/14* (2013.01); *G08B 21/06* (2013.01); *B60W 2040/0818* (2013.01); *B60W 2040/0827* (2013.01); *B60W 2040/0863* (2013.01); *B60W 2540/16* (2013.01); *B60W 2540/165* (2013.01); *B60W 2540/26* (2013.01); *F16H 2059/0247* (2013.01)

(58) Field of Classification Search
CPC ................ B60W 50/14; B60W 50/08; B60W 2040/0818; B60W 2040/0827; B60W 2540/26; G08B 21/06; B60K 28/06; B60K 28/066
USPC ............................................ 340/575
See application file for complete search history.

(56) References Cited

U.S. PATENT DOCUMENTS

| | | | | |
|---|---|---|---|---|
| 5,012,226 A | * | 4/1991 | Love ...... | G08B 21/06 180/272 |
| 5,684,462 A | * | 11/1997 | Gold ...... | G08B 21/06 180/272 |

(Continued)

FOREIGN PATENT DOCUMENTS

| | | |
|---|---|---|
| JP | 5-54300 A | 3/1993 |
| JP | 2001-137194 A | 5/2001 |
| WO | 2014/073079 A1 | 5/2014 |

OTHER PUBLICATIONS

Office Action dated Oct. 3, 2017, issued in counterpart Japanese Application No. 2016-067096, with English translation (6 pages).

(Continued)

*Primary Examiner* — John A Tweel, Jr.
(74) *Attorney, Agent, or Firm* — Westerman, Hattori, Daniels & Adrian, LLP (57) ABSTRACT

A vehicular awakening detection device 10 includes pressure sensors 48 provided in a + side paddle shift 46R and/or a − side paddle shift 46L which is able to be operated by a driver in a vehicle. The pressure sensor 48 is used for determining the degrees of awakening of a driver by making the driver to operate the + side paddle shift 46R and/or the − side paddle shift 46L.

7 Claims, 8 Drawing Sheets

(51) Int. Cl.
*B60W 50/14* (2012.01)
*F16H 59/02* (2006.01)

(56) References Cited

U.S. PATENT DOCUMENTS

| | | | | |
|---|---|---|---|---|
| 5,714,925 | A * | 2/1998 | Lee .................. | G08B 21/06 |
| | | | | 180/272 |
| 5,847,648 | A * | 12/1998 | Savor ................ | G04C 10/00 |
| | | | | 340/309.7 |
| 8,564,424 | B2 * | 10/2013 | Evarts ............... | B60W 40/08 |
| | | | | 340/426.24 |
| 9,047,170 | B2 * | 6/2015 | Naboulsi ........... | G08B 21/06 |

OTHER PUBLICATIONS

Office Action dated Apr. 17, 2018, issued in counterpart Japanese Application No. 2016-067096, with English machine translation. (7 pages).

* cited by examiner

VEHICULAR AWAKENING DETECTION DEVICE

CROSS-REFERENCE OF RELATED APPLICATION

This application claims priority of Japanese Patent Application No. 2016-067096 filed in Japan on Mar. 30, 2016, the entire contents of which are incorporated herein by reference.

TECHNICAL FIELD

The present invention relates to a vehicular awakening detection device for detecting degrees of awakening of a driver in a vehicle.

BACKGROUND OF THE INVENTION

For example, there is a case where degrees of awakening of a driver of a vehicle such as an automobile are reduced by continuing driving or the like. Therefore, it is necessary to detect a reduction in degrees of awakening of a driver, that is, a drowsy driving state, and to give a warning to the driver. Thus, Japanese Laid-open Patent Publication No. 2001-137194, for example, discloses a dozing detection device which can detect the dozing state of a driver with a simple method nearer to nature.

The dozing detection device includes temperature detecting means for detecting the skin temperature of a driver and dozing state determination means for determining whether the driver is in a dozing state or not by comparing the detected skin temperature and a threshold value. Therefore, it is possible to detect dozing without attaching an attachment to a driver and giving sense of discomfort to the driver.

SUMMARY OF INVENTION

In Japanese Laid-open Patent Publication No. 2001-137194, temperature sensors and infrared sensors are attached to a handle frame and a driver's seat to detect a skin temperature and a pressure sensor is attached to the handle frame to detect a pressure. Therefore, it is necessary to provide various sensors in a plurality of places, and thus there are problems in that the configuration becomes complicated and it is not economical. Furthermore, there is a problem in that the skin temperature of a driver is used for awakening determination, and thus it takes a considerable amount of time until the awakening determination is completed.

The present invention has been made in consideration of such problems. An object of the present invention is to provide a vehicular awakening detection device capable of quickly determining degrees of awakening of a driver, i.e., against drowsy driving, with a simple and economical configuration.

A vehicular awakening detection device according to the present invention includes an awakening degree detection sensor which is provided in a movable member which is able to be operated by a driver in a vehicle and determines degrees of awakening of the driver, by guiding (instructing) the driver to operate the movable member in a predetermined manner and detecting the driver's operation in response to the guidance.

Further, according to the vehicular awakening detection device, the movable member is preferably a paddle shift which is provided in the vicinity of a steering wheel of the vehicle and operates a gear shift stage, and the awakening degree detection sensor is preferably a pressure sensor.

Further, according to the vehicular awakening detection device, the pressure sensor preferably includes a variable resistor of which the resistance value is changed in accordance with the operation, and the awakening degree detection sensor preferably determines the degrees of awakening of the driver based on one or both of the operation speed, being detected from the difference between the resistance values in a predetermined sampling period of the variable resistor and the operating force detected from the maximum value or the minimum value of the resistance value in the operation time of the variable resistor.

Furthermore, according to the vehicular awakening detection device, the paddle shift preferably includes: a first spring member used as a reaction force of a normal shift switch; and a second spring member which applies a reaction force to the paddle shift when the paddle shift is operated to exceed the operation range of the normal shift switch and has the spring constant greater than that of the first spring member.

Further, according to the vehicular awakening detection device, the paddle shift preferably has: a left side paddle shift provided on the left side of the steering wheel; and a right side paddle shift provided on the right side of the steering wheel, and the awakening degree detection sensor determines the degrees of awakening of the driver in a state where both the left side paddle shift and the right side paddle shift are operated at the same time.

Effect of the Invention

According to the present invention, an awakening degree detection sensor is provided in a movable member which can be operated by a driver. Thus, it is possible to quickly determine degrees of awakening of a driver with a simple and economical configuration.

DETAILED DESCRIPTION OF THE INVENTION

Figure 1:
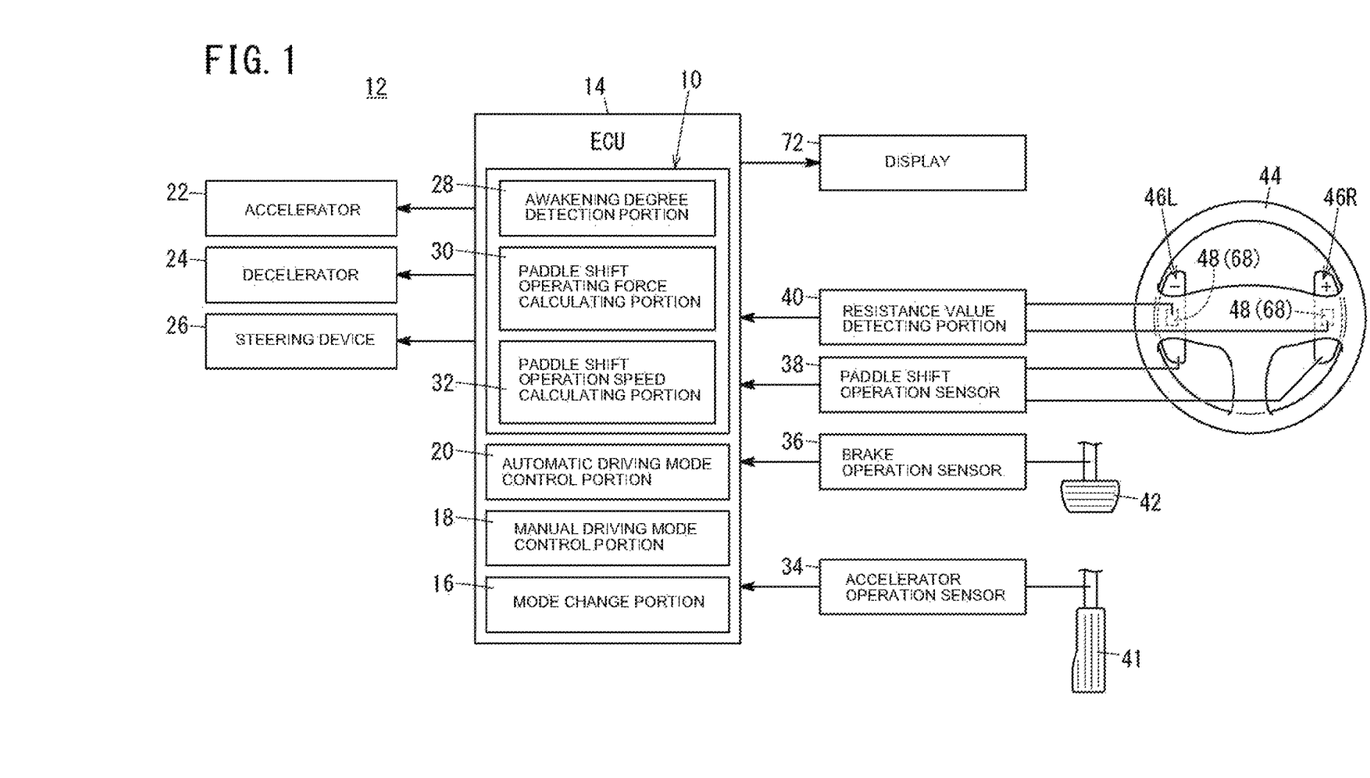
FIG. 1 is a schematic configuration view of a vehicle including a vehicular awakening detection device according to an embodiment of the present invention.

As illustrated in FIG. 1, a vehicle 12 including a vehicular awakening detection device 10 according to an embodiment of the present invention is, for example, an automobile which can be automatically driven. The vehicle 12 includes an electronic control unit 14 (which is referred to as an "ECU 14", hereinafter). The ECU 14 has a mode change portion 16, a manual driving mode control portion 18, and an automated driving mode control portion 20.

A driver operates a change switch (not illustrated) and the mode change portion 16 changes the driving mode of the vehicle 12 by operating. The driving mode includes, for example, a manual driving mode and an automated driving mode. The automated driving mode is a mode for performing automated driving of the vehicle 12 and the manual driving mode is a manual driving mode in a state where it is not possible to start automated driving.

The automated driving mode control portion 20 controls acceleration/deceleration and steering of the vehicle 12 in the automated driving mode by controlling an accelerator 22, a decelerator 24, and a steering device 26. The accelerator 22 operates the driving source of the vehicle 12 in accordance with the acceleration command from the ECU 14. When the vehicle 12 is a vehicle using an engine, the accelerator 22 operates, for example, a throttle valve in accordance with the acceleration command and operates the engine as a driving source. When the vehicle 12 is an electronic vehicle, the accelerator 22 operates an electric motor (a traveling motor) as a driving source in accordance with an acceleration command.

The decelerator 24 operates, for example, a brake actuator in accordance with a deceleration command from the ECU 14 and applies a braking force to the vehicle 12. The steering device 26 includes a manual steering system for manual steering and automatic steering system for automatic steering. The manual steering system includes, for example, a steering shaft, a steering gear box, a tie rod, an electric power steering device (an EPS device), and the like.

The ECU 14 includes an awakening degree detection portion (an awakening degree detection sensor) 28 constituting the vehicular awakening detection device 10, a paddle shift operating force calculating portion 30, and a paddle shift operation speed calculating portion 32. An accelerator operation sensor 34, a brake operation sensor 36, a paddle shift operation sensor 38, and a resistance value detecting portion 40 are connected to the ECU 14.

The accelerator operation sensor 34 detects the amount of operation of an accelerator pedal 41 by a driver. The brake operation sensor 36 detects the amount of operation of a brake pedal 42 by a driver. The paddle shift operation sensor 38 detects the operation of a + side paddle shift (a right side paddle shift provided on the right side of a steering wheel 44) 46R and a − side paddle shift (a left side paddle shift provided on the left side of the steering wheel 44) 46L, the paddles being provided in the steering wheel 44. The resistance value detecting portion 40 detects the resistance value obtained from a pressure sensor 48 described below and sends the information on the resistance value to the awakening degree detection portion 28.

In the embodiment, an awakening degree detection sensor such as a pressure sensor 48 is provided in the + side paddle shift 46R and the − side paddle shift 46L. Hereinafter, only the pressure sensor 48 provided in the + side paddle shift 46R is described and the description of the pressure sensor 48 of the − side paddle shift 46L will be omitted.

Figure 2:
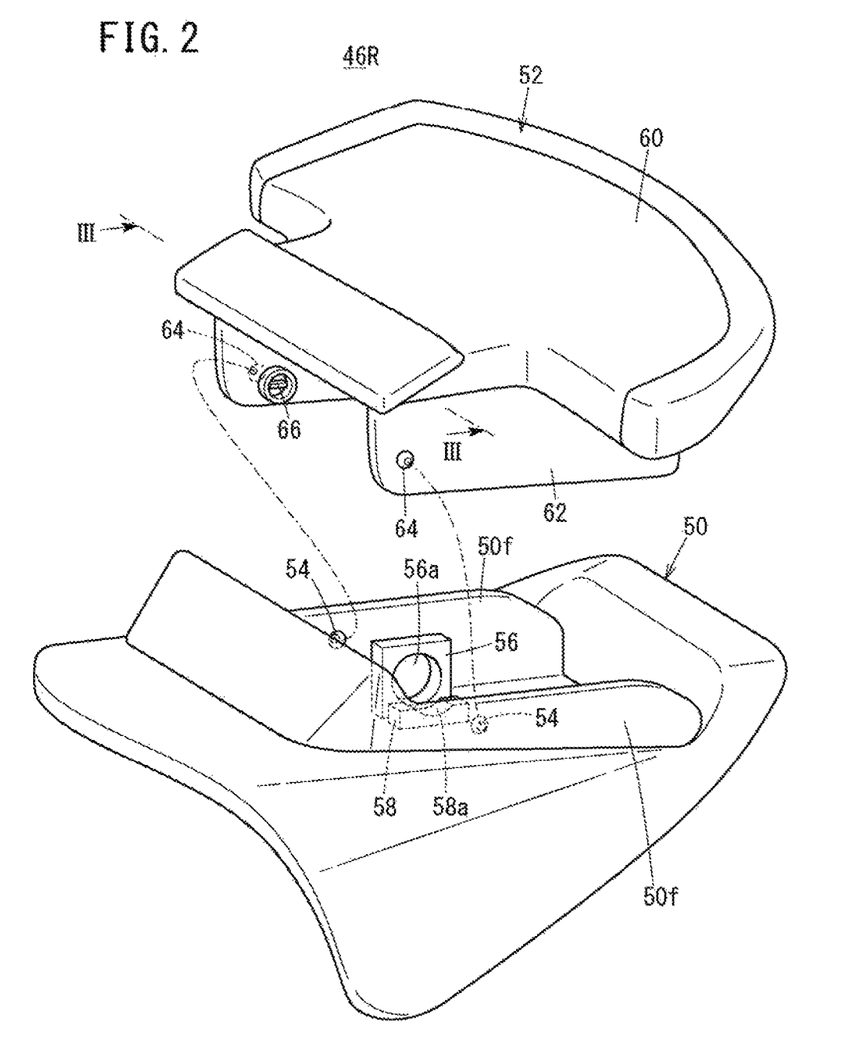
FIG. 2 is an exploded perspective explanatory view of a + side paddle shift constituting the vehicular awakening detection device.
Figure 3:
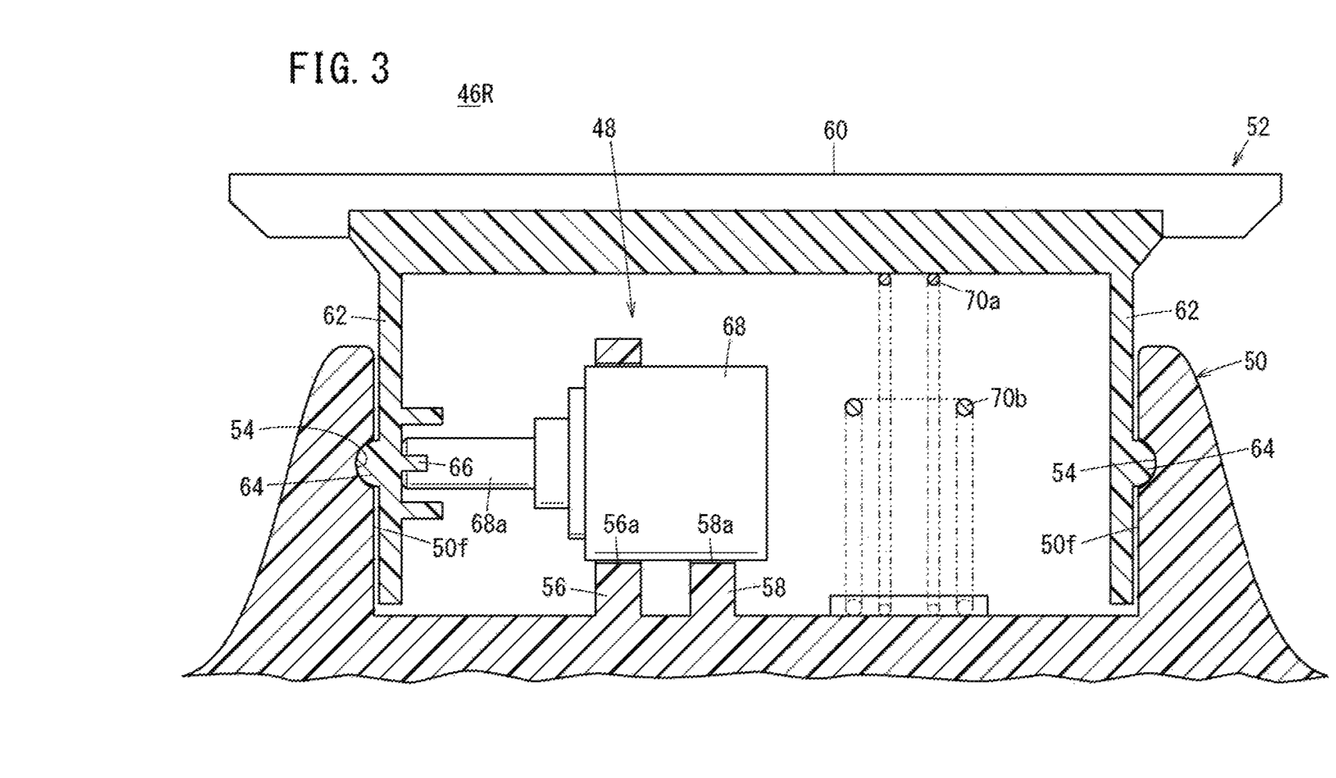
FIG. 3 is a cross-sectional view of the + side paddle shift taken along the line III-III in FIG. 2.

As illustrated in FIGS. 2 and 3, the + side paddle shift 46R includes a cover member 50 fixed to the steering wheel 44 and a movable member (a paddle) 52 which is tiltable and provided in the cover member 50. The cover member 50 has a pair of wall surfaces 50f parallel to each other and recessed portions 54 having a hemispherical shape are formed in the pair of wall surface 50f to face each other. In a portion between the pair of recessed portions 54, a first support plate 56 in which a hole portion 56a having a circular shape is formed is provided and a second support plate 58 in which a recessed portion 58a having a circular arc shape is formed is provided so as to be adjacent to the first support plate 56.

The movable member 52 has a pressing portion 60 which has a curved shape and is operated by the finger of a driver and a pair of plate-shaped portions 62 are formed at the position on the side opposite to the pressing portion 60. Protrusion portions 64 having a hemispherical shape are bulged on the outer surfaces of the pair of plate-shaped portions 62 and each protrusion portion 64 is fitted to the recessed portion 54. The movable member 52 can be tilted with the protrusion portion 64 and the recessed portion 54 as a fulcrum. In one plate-shaped portion 62, a convex portion 66 is bulged at the position on the axial line of the protrusion portion 64 in the surface opposite to the protrusion portion 64.

As illustrated in FIG. 3, the pressure sensor 48 includes a variable resistor 68 and the variable resistor 68 is inserted into the hole portion 56a and the recessed portion 58a and supported by the first support plate 56 and the second support plate 58. The tip end of a rotation shaft (a knob) 68a of the variable resistor 68 has a split shape and the convex portion 66 is fitted to the tip end. The rotation shaft 68a is disposed coaxially with the tilting fulcrum of the movable member 52 and the resistance value is changed by the rotation of the rotation shaft 68a.

In the cover member 50, a first spring member 70a and a second spring member 70b are coaxially arranged to be further adjacent to the pressing portion 60 side than the tilting fulcrum of the movable member 52. The first spring member 70a is used as a reaction force of a normal shift switch of the + side paddle shift 46R and is set to a relatively small spring constant.

The second spring member 70b has the wire diameter thicker than that of the first spring member 70a. The axial length of the second spring member 70b is shorter than that of the first spring member 70a and the diameter of the second spring member 70b is greater than that of the first spring member 70a. When the + side paddle shift 46R is operated to exceed the operation range of the normal shift switch, the second spring member 70b gives the reaction force to the + side paddle shift 46R. The spring constant of the second spring member 70b is set to be greater than that of the first spring member 70a. It is preferable that the spring constant of the second spring member 70b be set to the value at which a desired reaction force can be applied to the finger of a driver to detect degrees of awakening.

As illustrated in FIG. 1, the detected resistance value obtained from each pressure sensor 48 (each variable resistor 68) is input to the ECU 14 via the resistance value detecting portion 40. In the awakening degree detection portion 28, the degrees of awakening of a driver is determined based on one or both of the operation speed, being detected from the difference between the resistance values in a predetermined sampling period of the variable resistor 68 and the operating force detected from the maximum value or the minimum value of the resistance value in the operation time of the variable resistor 68, as described below. A display 72 is connected to the ECU 14. The display 72 is set to the location at which a driver can easily recognize the display 72. The location is, for example, a speedometer provided above the driver's seat side or in the central upper side of the dashboard, the navigation screen, or the like.

Next, the operation of the vehicular awakening detection device 10 configured as described above will be described below according to the flow chart illustrated in FIG. 4.

There is a case where the vehicle 12 travels on, for example, the highway in the automated driving mode. Therefore, it is necessary to detect the degrees of awakening of a driver before the vehicle 12 reaches a non-automated driving section in which automated driving cannot be performed. In this case, for example, the guidance such as "Please press the paddles when the light is displayed." as illustrated in FIG. 5 is displayed on the display 72 (a device for guiding a driver to operate a movable member in this embodiment) (Step S1 in FIG. 4). At this time, the vehicle 12 is in the automated driving mode and the travelling of the vehicle 12 is not influenced even when the + side paddle shift 46R and the − side paddle shift 46L are operated.

For the convenience of the recognition of a driver, it is preferable that the display type in which the steering wheel 44 is displayed and the + side paddle shift 46R and the − side paddle shift 46L stand out be used in the display 72.

The process proceeds to Step S2 and the light is displayed on the display 72 (or another monitor). A driver responses to the light and presses the + side paddle shift 46R and the − side paddle shift 46L. Therefore, the pressing portion 60 of the movable member 52 is pressed as illustrated in FIGS. 2 and 3, and thus the movable member 52 is tilted so as to compress the first spring member 70a and the second spring member 70b after the movable member 52 compresses the first spring member 70a.

In the pressure sensor 48, the convex portion 66 is fitted to the tip end of the rotation shaft 68a of the variable resistor 68 and the rotation shaft 68a is rotated by tilting of the movable member 52. Therefore, the resistance value (the operating force) of the variable resistor 68 is increased and the operation of the + side paddle shift 46R and the − side paddle shift 46L is detected (YES in Step S3).

Figure 6:
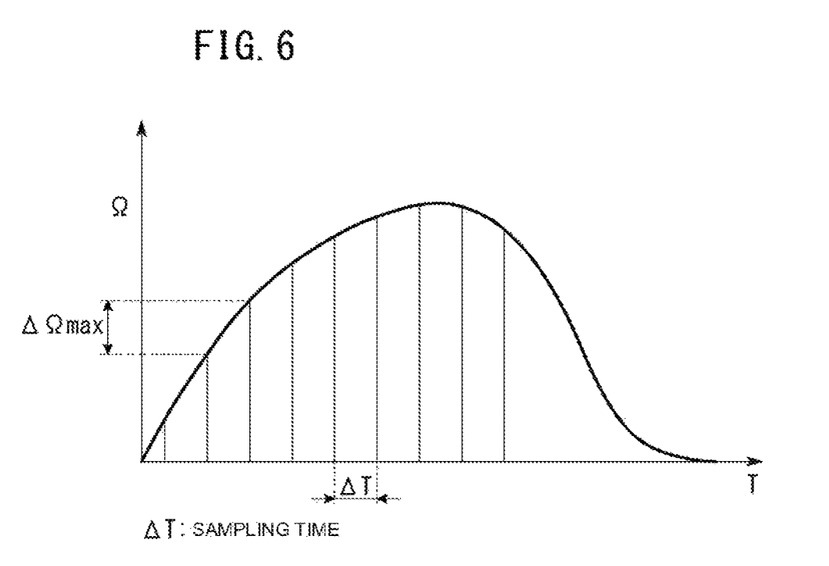
FIG. 6 is an explanatory view of a resistance value subjected to detection and a sampling time in the vehicular awakening detection device.

Next, the operation speed of the movable member 52 is calculated by the paddle shift operation speed calculating portion 32 from the operating force of the movable member 52, the force being calculated by the paddle shift operating force calculating portion 30. Specifically, in the paddle shift operating force calculating portion 30, a sampling time ΔT is set in advance, as illustrated in FIG. 6, and a resistance value Ω sent from the pressure sensor 48 in the sampling period is extracted.

Figure 7:
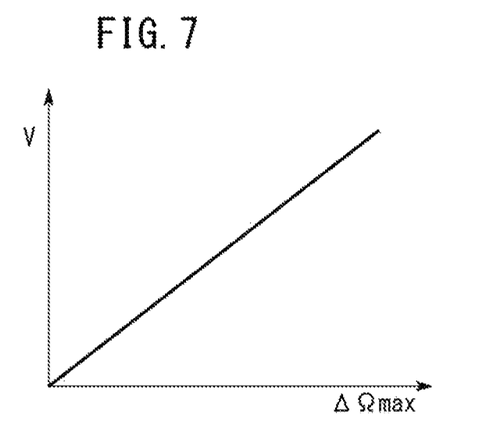
FIG. 7 is an explanatory view of an operation speed calculated from the resistance value and the sampling time shown in FIG. 6.

Then, the difference between the preceding resistance value and the present resistance value is calculated and a maximum resistance value change amount ΔΩmax is determined. Next, the operation speed (V=ΔΩmax/ΔT) is calculated by the maximum resistance value change amount ΔΩmax and the sampling time ΔT (see FIG. 7).

In Step S4, when it is determined that the calculated operation speed is faster than the predetermined speed (YES in Step S4), the process proceeds to Step S5. In Step S5, when it is determined that the operating force (one or both of the operating forces detected from the maximum value or the minimum value of the resistance value Ω during the operation) is smaller than the predetermined operating force set in advance (YES in Step S5), the process proceeds to Step S6 and the driver's attention is called. For example, it is preferable that an attention call by voice, vibration, or the like be performed. The reason for this is that it is determined that the awakening state (the degrees of awakening) is the dozing state (Step S7).

On the contrary, when it is determined that the operating force is larger than the set operating force in Step S5 (NO in Step S5), the process proceeds to Step S8. In Step S8, the operation speed and the operating force by a driver are stored in a memory (not illustrated), and then the process proceeds to Step S9 and it is determined that the awakening state (the degrees of awakening) of the driver is the normal state.

In addition, when it is determined that the calculated operation speed is slower than the set speed in Step S4 (NO in Step S4), the process proceeds to Step S10. In Step S10, remeasurement of the operation speed and the operating force by a driver is required. In Step S11, it is determined that the awakening state of the driver is not determined.

In this case, in the embodiment, the pressure sensors 48 as an awakening degree detection sensor are provided in the movable members 52, being able to be operated by a driver, of the + side paddle shift 46R and the − side paddle shift 46L, for example. The pressure sensor 48 includes the variable resistor 68. When the movable member 52 is pressed and tilted, the rotation shaft 68a is rotated and the output resistance value is changed in the variable resistor 68.

In addition, the first spring member 70a used as a reaction force of the normal shift switch and the second spring member 70b of which the spring constant is set to be greater than that of the first spring member 70a and the axial length is shorter than that of the first spring member 70a are arranged in the movable member 52. The reason for this is that, when the degrees of awakening are detected, the larger reaction force than that of the normal shift-switch operation is applied to the finger of a driver.

In the embodiment, the degrees of awakening (whether a driver is in a dozing state or in a normal state) of a driver are determined in a state where both the + side paddle shift 46R and the − side paddle shift 46L are operated at the same time. However, the degrees of awakening of a driver may be determined, for example, in a state where only either the + side paddle shift 46R or the − side paddle shift 46L is operated. In this case, a driver may press the movable member 52 which constitutes at least only one of the + side paddle shift 46R or − side paddle shift 46L. As a result, it is possible to obtain the effect that the degrees of awakening of a driver can be quickly reliably determined with the simple and economical configuration.

Furthermore, in the embodiment, the operation speed and the operating force when a driver operates the movable member 52 are calculated and the degrees of awakening of the driver is detected from this calculation result. However, the embodiment is not limited thereto. For example, only either the operation speed or the operating force when a driver operates the movable member 52 is calculated and the degrees of awakening of the driver may be detected from this calculation result.

In addition, in the embodiment, the degrees of awakening of a driver are detected before the driving mode of the vehicle 12 is changed from the automated driving mode to the manual driving mode. However, the embodiment is not limited thereto. For example, the degrees of awakening of a driver may be detected when it is determined that there is a concern that a sign of dozing appears or at constant time intervals based on the driving state in the manual driving mode. At this time, the paddle shift operation signal is prevented from being input to the ECU 14 from the paddle shift operation sensor 38.

Furthermore, to detect the degrees of awakening of a driver, the accelerator pedal 41 or the brake pedal 42 can be used instead of the + side paddle shift 46R and the − side paddle shift 46L. In this case, a pressure sensor is installed in the accelerator pedal 41 or the brake pedal 42. In addition, in the automated driving mode, the accelerator pedal 41 or the brake pedal 42 does not apply an influence on travelling of the vehicle 12 even when a driver operates the pedal.

Furthermore, the guidance and the screen such as "Please step the accelerator pedal when the light is displayed." or "Please step the brake pedal when the light is displayed." is displayed on the display 72. Therefore, a driver steps the accelerator pedal 41 or the brake pedal 42 and the operating force (the stepping force) is measured by a pressure sensor. Thus, the degrees of awakening of a driver can be detected from either the operating force and the operation speed or the operating force and the operation speed.

Figure 8:
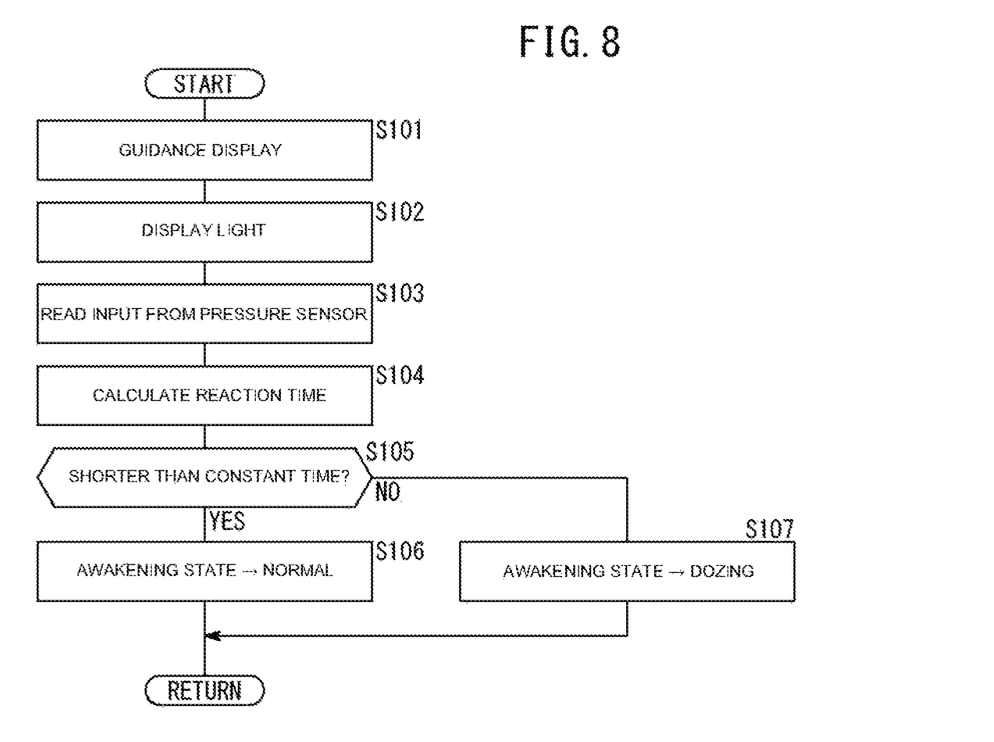
FIG. 8 is a flow chart showing another operation of the vehicular awakening detection device.

FIG. 8 is a flow chart illustrating another operation of the vehicular awakening detection device 10 according to the embodiment.

Figure 4:
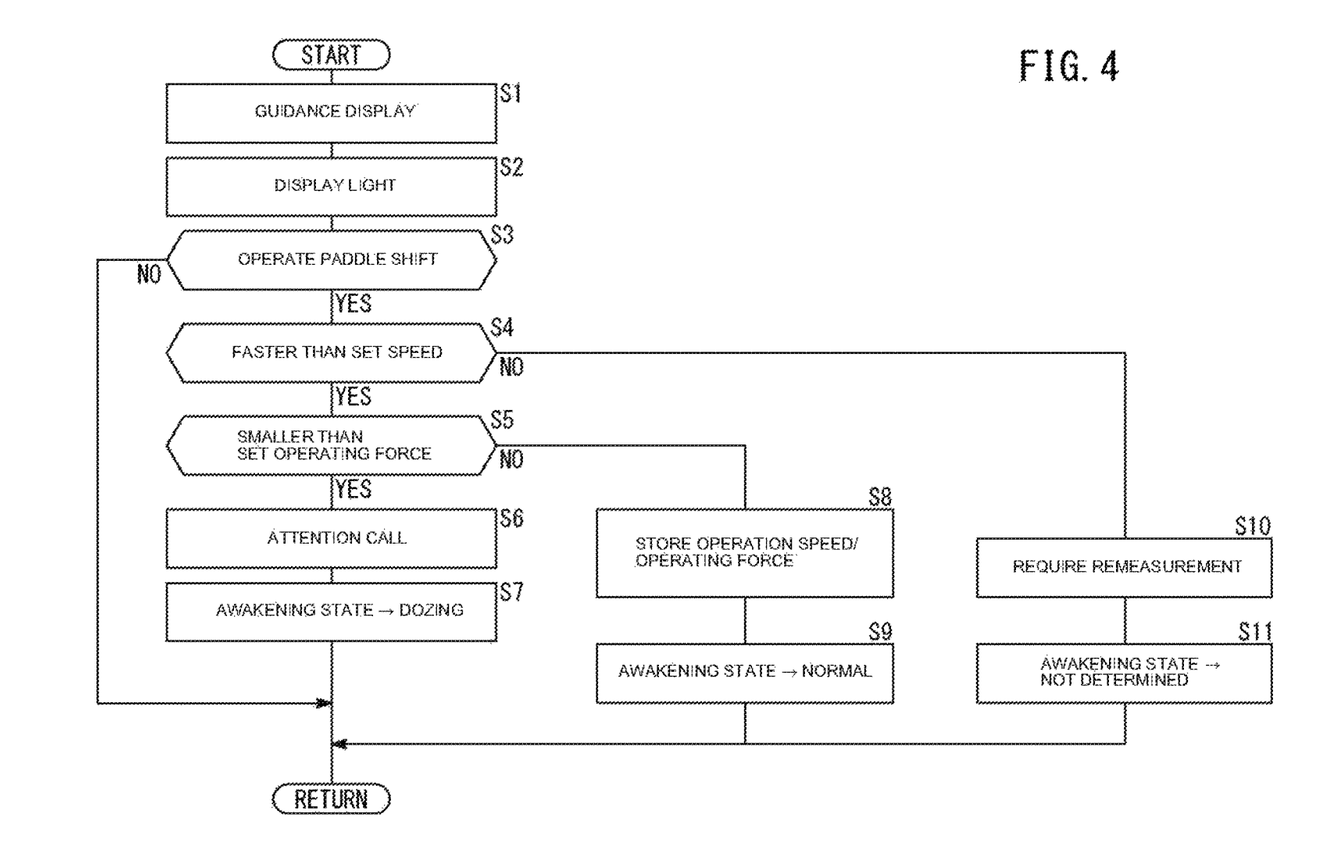
FIG. 4 is a flow chart showing the operation of the vehicular awakening detection device.
Figure 5:
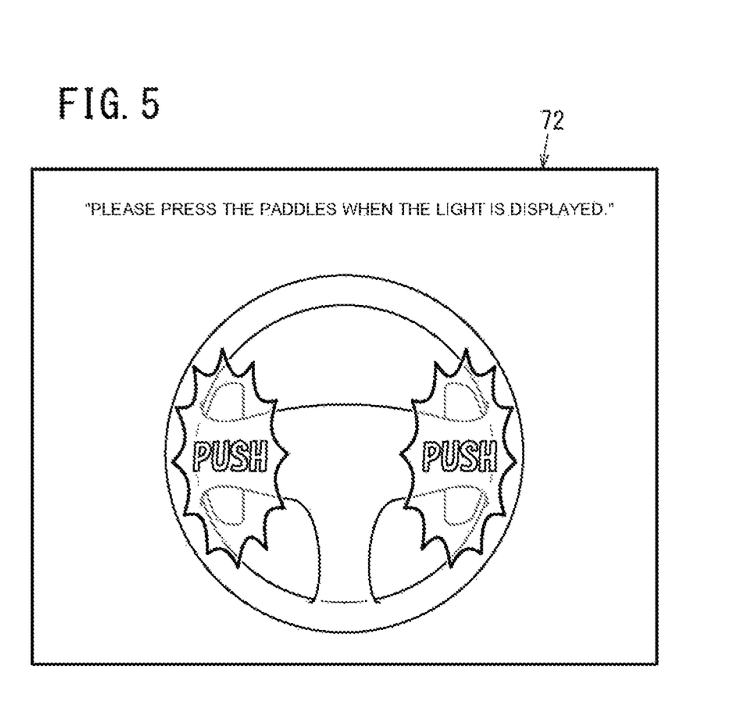
FIG. 5 is an explanatory view of a guidance display in the vehicular awakening detection device.

Steps S101 and S102 of FIG. 8 are similar to Steps S1 and S2 of FIG. 4. In Step S102, the light is displayed on the display 72 (or another monitor), and then the process proceeds to Step S103 and the resistance value from the pressure sensor 48 is read. In addition, in Step S104, the time (the reaction time) from when the light is displayed to when a driver operates the movable member 52 is calculated.

Next, it is determined whether the reaction time of a driver is shorter than the predetermined constant time or not (Step S105). When it is determined that the reaction time of a driver is shorter than the constant time (YES in Step S105), the process proceeds to Step S106 and it is determined that the awakening state of the driver is in a normal state.

On the contrary, when it is determined that the reaction time of a driver is greater than the predetermined constant time (NO in Step S105), the process proceeds to Step S107 and it is determined that the awakening state of the driver is in a dozing state.

DESCRIPTION OF REFERENCE NUMERALS 10 vehicular awakening detection device
12 vehicle
14 ECU
16 mode change portion
18 manual driving mode control portion
20 automated driving mode control portion
28 awakening degree detection portion
30 paddle shift operating force calculating portion
32 paddle shift operation speed calculating portion
34 accelerator operation sensor
36 brake operation sensor
38 paddle shift operation sensor
40 resistance value detecting portion
44 steering wheel
46L − side paddle shift
46R + side paddle shift
48 pressure sensor
50 cover member
52 movable member
60 pressing portion
68 variable resistor
68a rotation shaft
70a, 70b spring member
72 display

The invention claimed is:

1. A vehicular awakening detection device comprising:
an awakening degree detection sensor provided in a movable member which is able to be operated by a driver in a vehicle and configured to determine degrees of awakening of the driver by making said driver to operate said movable member, wherein
said movable member is a paddle shift which is provided in a vicinity of a steering wheel of the vehicle for the driver to operate a gear shift, and
said awakening degree detection sensor is a pressure sensor provided in the paddle shift.

2. The vehicular awakening detection device according to claim 1, further comprising:
a device provided in the vehicle and configured to provide guidance to the driver regarding an operation of the movable member, wherein
the awakening degree detection sensor is configured to detect the operation of the movable member by the driver and to determine the degrees of awakening of the driver based on a detection result of the operation of the movable member in response to the guidance given to the driver.

3. The vehicular awakening detection device according to claim 1,
wherein said pressure sensor comprises a variable resistor of which a resistance value is changed in accordance with said operation, and
said awakening degree detection sensor determines the degrees of awakening of said driver based on one or both of: said operation speed detected from a difference between resistance values detected at an interval of a predetermined sampling period; and an operating force detected from a maximum value or a minimum value of the resistance value during said operation.

4. A vehicular awakening detection device comprising:
an awakening degree detection sensor provided in a movable member which is able to be operated by a driver in a vehicle and configured to determine degrees of awakening of the driver by making said driver to operate said movable member, wherein
said movable member is a paddle shift which is provided in a vicinity of a steering wheel of the vehicle for the driver to operate a gear shift, and
said awakening degree detection sensor is a pressure sensor provided in the paddle shift,
said paddle shift comprises:
a first spring member which generates a first reaction force in response to an operation of the paddle shift in an operation range of a normal shift switch; and
a second spring member which generates a second reaction force in response to the operation of the paddle shift in an operation range which exceeds the operation range of said normal shift switch, the second spring member having a spring constant greater than that of said first spring member.

5. A vehicular awakening detection device comprising:
an awakening degree detection sensor provided in a movable member which is able to be operated by a driver in a vehicle and configured to determine degrees of awakening of the driver by making said driver to operate said movable member, wherein
said movable member is a paddle shift which is provided in a vicinity of a steering wheel of the vehicle for the driver to operate a gear shift, and
said awakening degree detection sensor is a pressure sensor provided in the paddle shift,
said paddle shift has:
a left side paddle shift provided on a left side of said steering wheel; and
a right side paddle shift provided on a right side of said steering wheel, and
said awakening degree detection sensor determines the degrees of awakening of said driver in a state where both said left side paddle shift and said right side paddle shift are operated at the same time.

6. The vehicular awakening detection device according to claim 4, further comprising:
   a device provided in the vehicle and configured to provide guidance to the driver regarding an operation of the movable member, wherein
   the awakening degree detection sensor is configured to detect the operation of the movable member by the driver and to determine the degrees of awakening of the driver based on a detection result of the operation of the movable member in response to the guidance given to the driver.

7. The vehicular awakening detection device according to claim 5, further comprising:
   a device provided in the vehicle and configured to provide guidance to the driver regarding an operation of the movable member, wherein
   the awakening degree detection sensor is configured to detect the operation of the movable member by the driver and to determine the degrees of awakening of the driver based on a detection result of the operation of the movable member in response to the guidance given to the driver.

* * * * *